United States Patent
Lin et al.

(10) Patent No.: US 8,330,871 B2
(45) Date of Patent: Dec. 11, 2012

(54) METHOD AND APPARATUS FOR DETECTING MOTION IN AN IMAGE DISPLAY DEVICE

(75) Inventors: Teng-Yi Lin, Kaohsiung County (TW); Chuan-Lung Huang, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1652 days.

(21) Appl. No.: 11/695,622

(22) Filed: Apr. 3, 2007

(65) Prior Publication Data

US 2008/0151122 A1 Jun. 26, 2008

(30) Foreign Application Priority Data

Dec. 11, 2006 (TW) ................................ 95146268 A

(51) Int. Cl.
*H04N 5/14* (2006.01)
*H04N 9/64* (2006.01)

(52) U.S. Cl. ...................................................... 348/702

(58) Field of Classification Search .................. None
See application file for complete search history.

(56) References Cited

U.S. PATENT DOCUMENTS

| 4,410,914 | A * | 10/1983 | Siau | ........................ 348/208.3 |
| 7,057,664 | B2 * | 6/2006 | Law et al. | ........................ 348/448 |
| 7,397,515 | B2 * | 7/2008 | Walls et al. | ........................ 348/624 |
| 7,432,987 | B2 * | 10/2008 | Shan et al. | ........................ 348/667 |

FOREIGN PATENT DOCUMENTS

TW I228935 3/2005

OTHER PUBLICATIONS

Peng, Title of Thesis: Y/C Separation Technique and Prototyping Verification for Composite Video Signal Decoding, p. 41-42 and 74, Jun. 2005.

* cited by examiner

*Primary Examiner* — Nhon Diep

(74) *Attorney, Agent, or Firm* — Winston Hsu; Scott Margo

(57) ABSTRACT

A method for detecting motion in an image display device includes receiving a plurality of composite signals having luminance signals and chrominance signals corresponding to a plurality of frames, determining luminance motion factors of the plurality of frames according to the luminance signals of the plurality of composite signals, determining chrominance motion factors of the plurality of frames according to edge intensities of the plurality of frames and the chrominance signals of the plurality of composite signals, and determining motion factors of the plurality of frames according to the luminance motion factors and the chrominance motion factors.

12 Claims, 6 Drawing Sheets

METHOD AND APPARATUS FOR DETECTING MOTION IN AN IMAGE DISPLAY DEVICE

BACKGROUND OF THE INVENTION

1. Field of the Invention

The present invention relates to a method and apparatus for detecting motion in an image display device, and more particularly, to a motion detection method and apparatus for respectively determining luminance motion factors and chrominance motion factors to further determine motion factors of images.

2. Description of the Prior Art

With technological advances in display technology, video processing, and integrated circuit fabrication, in tandem with the rapid development of wireless networking, users can view their favorite movies and television programs on a video display device (such as a television) any time, any place. Thus, information and entertainment become increasingly accessible, and user requirements for picture quality increase in like manner.

The human eye has four different types of light receptor, of which three are used for distinguishing light of different wavelength (the fourth is only used under dim lighting conditions, and cannot discern colors). In other words, all light visible to the human eye can be fully described by three axes. Thus, when displaying a picture, only red, blue, and green (RGB) light information output is needed, when speaking in terms of the human eye, to show an image of realistic quality. However, to reduce bandwidth and ensure compatibility, the prior art color television broadcast system does not directly output RGB signals, but instead outputs a composite signal. The "composite" signal is an output signal that is a mix of a luminance signal and a chrominance signal, which is compatible with black-and-white and color television systems, and also conserves bandwidth.

The earliest television was the black-and-white television. Later, when color television systems were being developed, to promote compatibility between black-and-white television signals and color television signals, black-and-white (luminance) signals and color (chrominance) signals were separated. In this way, a black-and-white television needed only to decode the incoming luminance signal from a television station in order to display a picture. Color televisions would decode both the luminance signal and the chrominance signal together in order to display a color picture. Because the human eye is more sensitive to luminance than chrominance, or in other words, the human eye requires less color resolution than black-and-white resolution, the color signal does not require as much bandwidth as the black-and-white signal. Thus, by taking advantage of the human eye's relative insensitivity to color, transmission bandwidth can be reduced and adapted in black-and-white and color televisions.

Taking the National Television Standards Committee (NTSC) standard as an example, NTSC originally used a YIQ color space. The YIQ color space uses quadrature modulation to synthesize a common spectrum intermodulation signal I with a quadrature signal Q to form a single chrominance signal C. The chrominance signal C is then added to a luminance signal Y, and with an accompanying horizontal synchronization pulse, a blanking pulse, and a color burst, the composite signal is generated. The NTSC standard adopts a 6 MHz channel bandwidth, with 4.2 MHz reserved for the luminance signal Y, 1.6 MHz given to the intermodulation signal I, and 0.6 MHz appropriated to the quadrature signal Q. In contrast to the NTSC standard signal, the Phase Alternating Line (PAL) standard adopts a YUV color space. To increase picture quality, a color phase of the chrominance signal is alternately set as positive and negative for each successive scanline. The PAL standard uses an 8 MHz channel, allocating 5.5 MHz to the luminance signal Y and 1.8 MHz to a signal U and a signal V.

Thus, by splitting the luminance signal and the chrominance signal, then transmitting the signals together, the transmission bandwidth can be reduced, and the transmitted signal can be used in both black-and-white and color televisions. Correspondingly, a receiving end need only comprise a circuit such as a comb filter, for isolating the luminance signal Y and the chrominance signal C, in order to play both black-and-white and color television. However, the composite Y/C signal has one large problem, which primarily lies in the fact that high-frequency components of the luminance signal Y overlap with the frequency spectrum of the chrominance signal C. This makes it difficult for the receiving end to accurately and completely separate the luminance signal Y and the chrominance signal C in their original forms from the composite signal Y/C. Ultimately, this inability to separate the luminance signal Y from the chrominance signal C results in flaws in the picture. For example, if the luminance signal Y is processed as part of the chrominance signal C, a cross-color artifact is produced, and the picture will exhibit a rainbow effect. Likewise, if the chrominance signal C is processed as part of the luminance signal Y, a cross-luminance artifact is produced, resulting in a horizontal or vertical dotted line in the static picture, and a meshed image in the motion picture.

As well known in the art, in the NTSC image system, phases of sub-carriers of the chrominance signal convert 180 degree between adjacent image frames. In this way, when the luminance information is mistakenly decoded as the chrominance information (cross-color artifact), the chrominance information oscillates with two complementary colors such as red and green. That is, due to 180-degree phase difference, the luminance information becomes two complementary colors in chrominance spectrum. Similarly, when the chrominance information is mistakenly decodes as the luminance information (cross-luminance artifact), the effect of 180-degree phase difference can also be observed in the luminance information of adjacent frames. Since the phase difference is 180 degree, the cross color artifact can be suppressed by subtracting the composite video information of adjacent image frames for returning the original chrominance information. Likewise, the cross color artifact can be suppressed by averaging the composite video information of two adjacent image frames. However, this technique works only when the image is static or still. Therefore, in order to effectively enhance the quality of static images and motion images, the prior art luminance and chrominance separation circuit selects an appropriate filter for performing filtering operations according as the image is static or in motion.

Please refer to FIG. 1. FIG. 1 is a schematic diagram of a prior art three-dimensional luminance and chrominance separation circuit 10 for the NTSC image system. The three-dimensional luminance and chrominance separation circuit 10 includes a low-pass filter 100, a two-dimensional comb filter 102, a three-dimensional comb filter 104, an edge detector 106, and a filter selection unit 108. The edge detector 106 can determine whether corresponding pixels are corresponding to horizontal or vertical "image edges" (i.e. boundaries of large gray value differences), and decide weighting values of signals Y1 and C1 outputted by the low-pass filter 100 and signals Y2 and C2 outputted by the two-dimensional comb filter 102, so as to output luminance signals Y4 and chrominance signals C4. The luminance signals Y4 and the chrominance signals C4 outputted by the edge detector 106 can improve the image quality of motion pictures, while the three-dimensional comb filter 104 can enhance the image quality of static pictures. The filter selection unit 108 includes a motion detector 110 for determining whether the image is in motion or static. The filter selection unit 108 can determine weighting values of the signals Y4 and C4 outputted by the edge detector 106 and signals Y3 and C3 outputted by the three-dimensional comb filter 104, so as to output luminance signals Y and chrominance signals C.

In the prior art, the methods for the motion detector 110 to determine whether the image is in motion or static can be generalized into two kinds. First, since phases of chrominance sub-carriers convert 180 degree between adjacent frames in the NTSC image system, the motion detector 110 can determine whether the image is in motion or static according to differences of the composite video signals between two frames separated by one frame. However, with this method, some motion images may be mistakenly decoded as static images. For example, an object jumps or swings between two positions (such as a swinging squirrel tail), so that images of two frames separated by one frame are the same or similar. In this case, the motion detector 110 will determine motion images as static images incorrectly.

Second, since the frequency spectrum of the chrominance signals lies in a high-frequency part of the composite video signals, the motion detector 110 can determine whether the image is in motion or static according to low-frequency components of the composite video signals (namely, low-frequency luminance signals) between adjacent frames. In this case, if a motion image has chrominance differences but no luminance differences, the motion detector 110 will determine motion images as static images incorrectly.

Therefore, when motion detection results of the motion detector 110 mistakes, the filter selection unit 108 introduces an incorrect weighting ratio for the signals Y4 and C4 and the signals Y3 and C3, and further influences the luminance signals Y and the chrominance signals C, so as to deteriorate the image quality.

SUMMARY OF THE INVENTION

It is therefore a primary objective of the present invention to provide a method and related apparatus for detecting motion in an image display device.

The present invention discloses a method for detecting motion in an image display device. The method comprises receiving a plurality of composite video signals having luminance signals and chrominance signals corresponding to a plurality of frames, determining luminance motion factors of the plurality of frames according to the luminance signals of the plurality of composite video signals, determining chrominance motion factors of the plurality of frames according to edge intensities of the plurality of frames and the chrominance signals of the plurality of composite video signals, and determining motion factors of the plurality of frames according to the luminance motion factors and the chrominance motion factors.

The present invention further discloses a motion detection device for an image display device. The motion detection device comprises a reception end for receiving a plurality of composite video signals having luminance signals and chrominance signals corresponding to a plurality of frames, a luminance motion detection unit coupled to the reception end for determining luminance motion factors of the plurality of frames according to the luminance signals of the plurality of composite video signals, a chrominance motion detection unit coupled to the reception end for determining chrominance motion factors of the plurality of frames according to edge intensities of the plurality of frames and the chrominance signals of the plurality of composite video signals, and a motion factor decision unit coupled to the luminance motion detection unit and the chrominance motion detection unit for determining motion factors of the plurality of frames according to the luminance motion factors and the chrominance motion factors.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
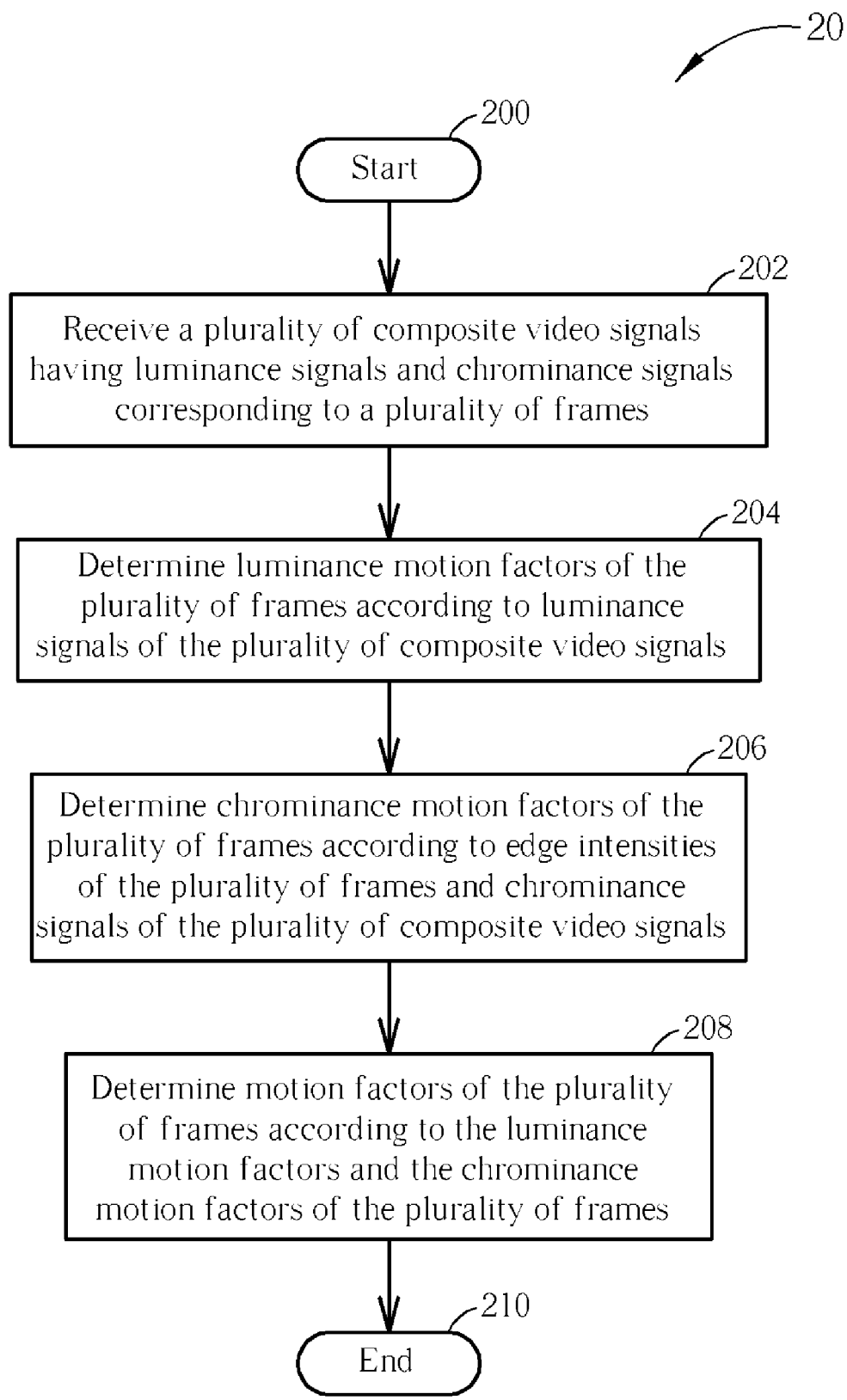
FIG. 2 is a schematic diagram of a process according to an embodiment of the present invention.

Please refer to FIG. 2. FIG. 2 is a schematic diagram of a process 20 according to an embodiment of the present invention. The process 20 is utilized for detecting image motion in an image display device, and comprises the following steps:

Step 200: start.

Step 202: receive a plurality of composite video signals having luminance signals and chrominance signals corresponding to a plurality of frames.

Step 204: determine luminance motion factors of the plurality of frames according to luminance signals of the plurality of composite video signals.

Step 206: determine chrominance motion factors of the plurality of frames according to edge intensities of the plurality of frames and chrominance signals of the plurality of composite video signals.

Step 208: determine motion factors of the plurality of frames according to the luminance motion factors and the chrominance motion factors of the plurality of frames.

Step 210: end.

According to the process 20, the present invention determines the luminance motion factors in the frames according to the luminance signals of the composite video signals, determines the chrominance motion factors in the frames according to the edge intensities of the frames and the chrominance signals of the composite video signals, and then determines the motion factors of the frames according to the luminance motion factors and the chrominance motion factors. Therefore, the process 20 determines the motion factors of the image frames according to the luminance motion factors and the chrominance motion factors simultaneously. In this case, if a motion image has only chrominance differences but no great luminance differences, the present invention can determine the image as a motion image correctly.

Preferably, the process 20 determines the luminance motion factors and the chrominance motion factors according to the luminance signals and the chrominance signals corresponding to two adjacent frames. Therefore, when an object of the images jumps or swings between two positions (for example, a swinging squirrel tail) to make the images of two frames separated by one frame are the same or similar, the present invention can still determine the image as a motion image correctly. Furthermore, as the composite video signals conform to the NTSC broadcast television standard, step 204 can determine the luminance motion factors of the plurality of frames according to low-frequency components of the composite video signals, and step 206 can calculate differences of chrominance signals with the same phase between adjacent frames and adjust a calculation result according to edge intensities of the frames for determining the chrominance motion factors. The detailed description is stated as follows.

Figure 6:
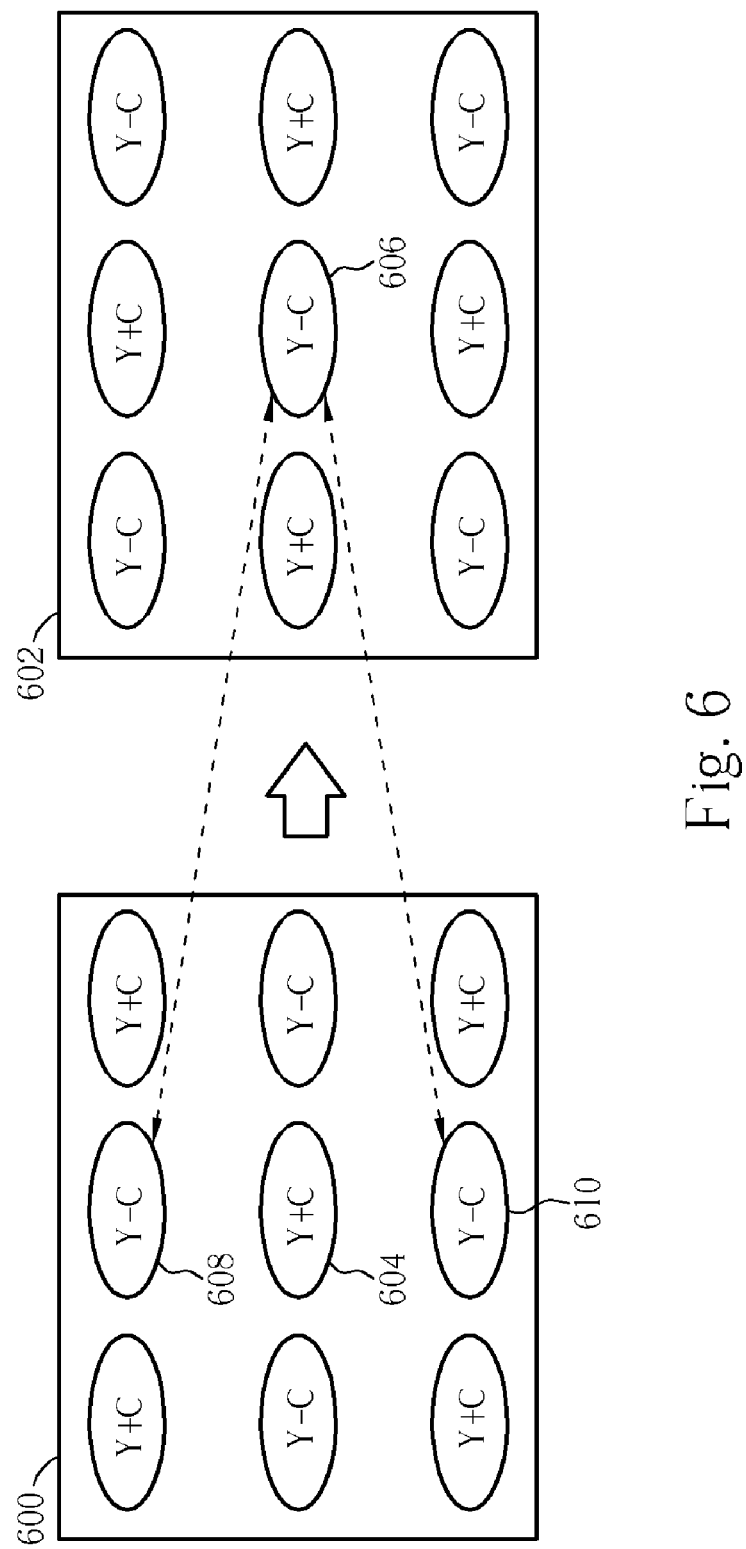
FIG. 6 is a schematic diagram of luminance signals and chrominance signals of two successive frames in a prior art NTSC image system.

Firstly, please refer to FIG. 6. FIG. 6 is a schematic diagram of luminance signals Y and chrominance signals C of two successive frames 600 and 602 in the prior art NTSC image system. As well known in the art, high-frequency components of the luminance signals Y and the chrominance signals C lie in the same frequency spectrum, and that is, low-frequency components of the composite video signals are low-frequency components of the luminance signals Y. Thus, step 204 can determine the luminance motion factors of adjacent frames according to differences of low-frequency components of the composite video signals corresponding to the adjacent frames. On the other hand, as shown in FIG. 6, phases of the chrominance signals C convert 180 degree in adjacent frames. For example, in the frames 600 and 602, the chrominance signals C of pixels 604 and 606, which are corresponding to the same position, are represented with different symbols (i.e. converting 180 degree). Therefore, in order to determine the chrominance motion factors correctly, step 206 can calculate the differences of the chrominance signals with the same phase between the frames 600 and 602 for determining the chrominance variation of adjacent frames, and further adjust a calculation result according to edge intensities of the frames for determining the chrominance motion factors.

Therefore, the process 20 determines the motion factors according to the luminance motion factors and the chrominance motion factors of adjacent frames. In this case, if a motion image has chrominance differences but no great luminance differences or an image has an object jumping or swinging between two positions, the present invention can correctly determine the image as a motion image.

Figure 1:
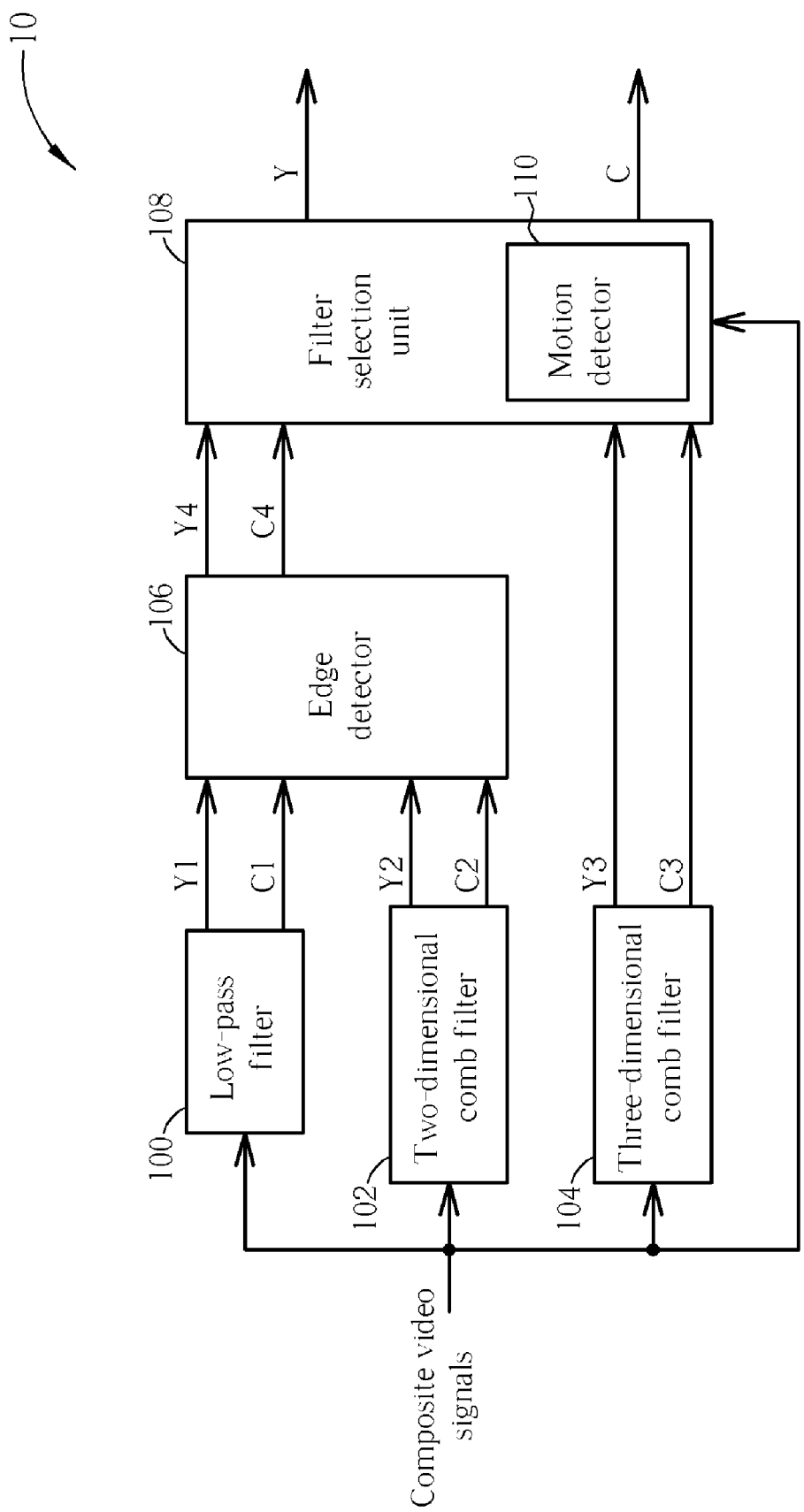
FIG. 1 is a schematic diagram of a prior art three-dimensional luminance and chrominance separation circuit for the NTSC image system.
Figure 3:
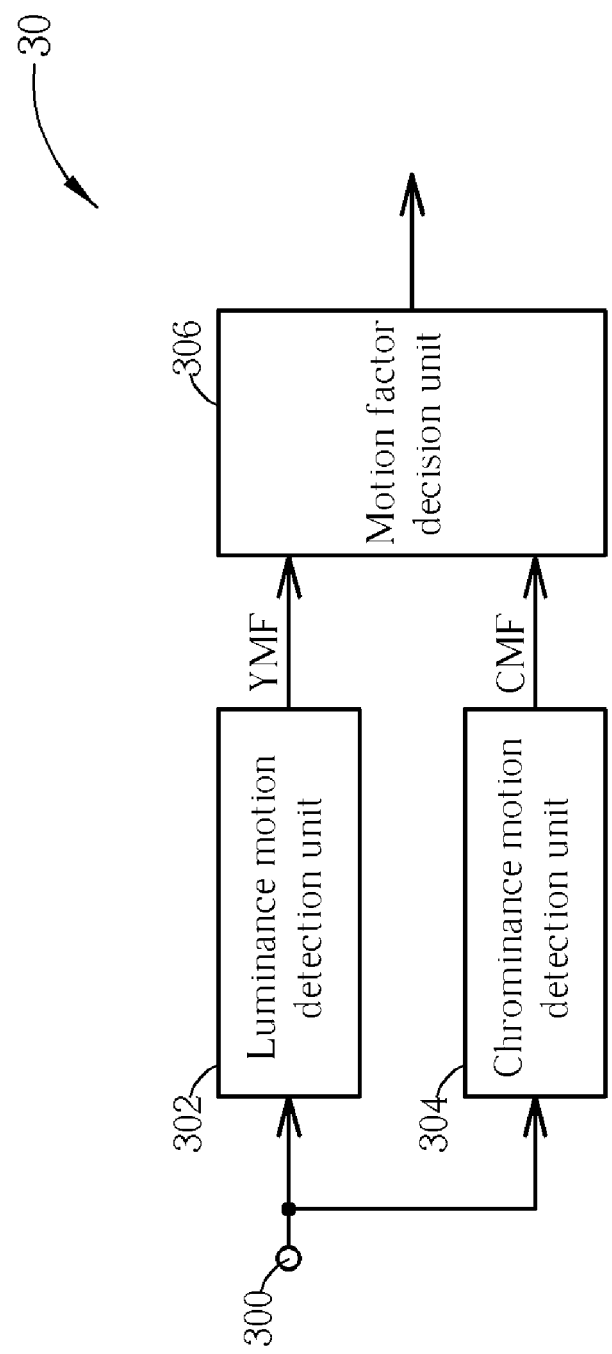
FIG. 3 is a function block diagram of a motion detection device for an image display device according to an embodiment of the present invention.

Please refer to FIG. 3. FIG. 3 is a function block diagram of a motion detection device 30 for an image display device according to an embodiment of the present invention. The motion detection device 30 is utilized for realizing the process 20, which can replace the motion detector 110 in FIG. 1 for enhancing accuracy when detecting static and motion images. The motion detection device 30 comprises a reception end 300, a luminance motion detection unit 302, a chrominance motion detection unit 304, and a motion factor decision unit 306. The reception end 300 is utilized for receiving composite video signals, which conform to NTSC broadcast television standard. The luminance motion detection unit 302 is coupled to the reception end 300, and utilized for determining luminance motion factors YMF of images according to luminance signals of the composite video signals. The chrominance motion detection unit 304 is coupled to the reception end 300, and utilized for determining chrominance motion factors CMF of the images according to edge intensities of image frames and chrominance signals of the composite video signals. The motion factor decision unit 306 is coupled to the luminance motion detection unit 302 and the chrominance motion detection unit 304, and utilized for determining motion factors of the images according to the luminance motion factors YMF and the chrominance motion factors CMF.

Therefore, the motion detection device 30 determines the motion factors of the images according to the luminance motion factors YMF determined by the luminance motion detection unit 302 and the chrominance motion factors CMF determined by the chrominance motion detection unit 304. In other words, the motion detection device 30 determines the motion factors of the images according to the luminance motion factors YMF and the chrominance motion factors CMF simultaneously. In this case, if a motion image has only chrominance differences but no great luminance differences, the present invention still can determine the image as a motion image.

Preferably, the luminance motion detection unit 302 and the chrominance motion detection unit 304 determine the luminance motion factors YMF and the chrominance motion factors CMF according to the luminance signals and the chrominance signals corresponding to adjacent frames. Therefore, when an object jumps or swings between two positions to make the images of two frames separated by one frame are the same or similar, the present invention can determine the image as a motion image correctly.

Figure 4:
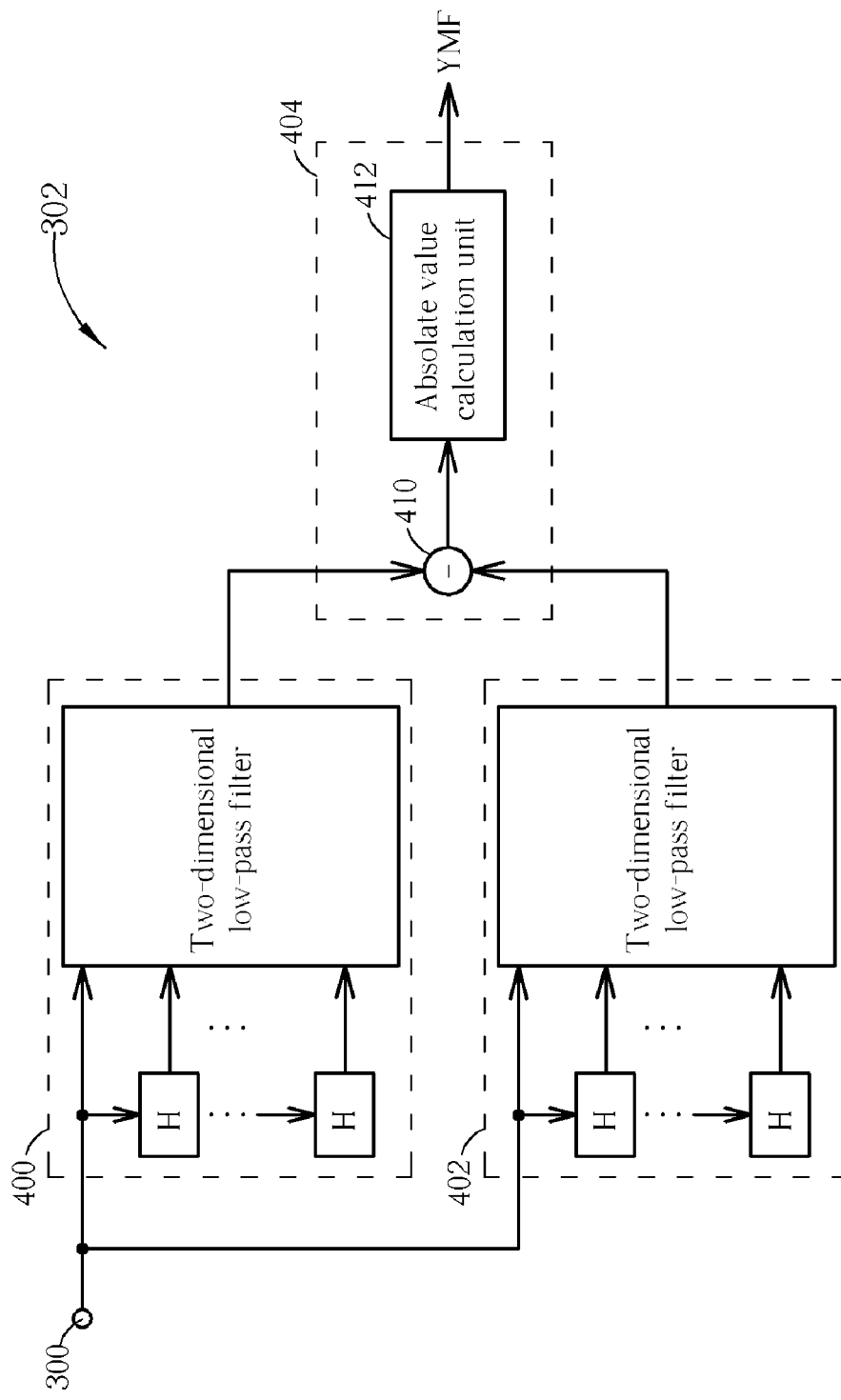
FIG. 4 is a schematic diagram of a preferred embodiment of the luminance motion detection unit.

Please refer to FIG. 4. FIG. 4 is a schematic diagram of a preferred embodiment of the luminance motion detection unit 302. The luminance motion detection unit 302 comprises a first low-pass filtering unit 400, a second low-pass filtering unit 402, and a difference decision unit 404. The first low-pass filtering unit 400 and the second low-pass filtering unit 402 are utilized for performing low-pass filtering operations for the composite video signals of two adjacent frames, and each of them consists of a plurality of storage units H and a two-dimensional low-pass filter. For example, the $N^{th}$ image data can be transmitted to the first low-pass filtering unit 400, while the $(N+1)^{th}$ image data can be transmitted to the second low-pass filtering unit 402. The storage units H are utilized for temporally storing data, of which the number is equal to length of scan lines. The difference decision unit 404 comprises a subtraction unit 410 and an absolute value calculation unit 412, and is utilized for calculating differences of low-pass filtering results of the first low-pass filtering unit 400 and the second low-pass filtering unit 402, so as to determine the luminance motion factors YMF.

Figure 5:
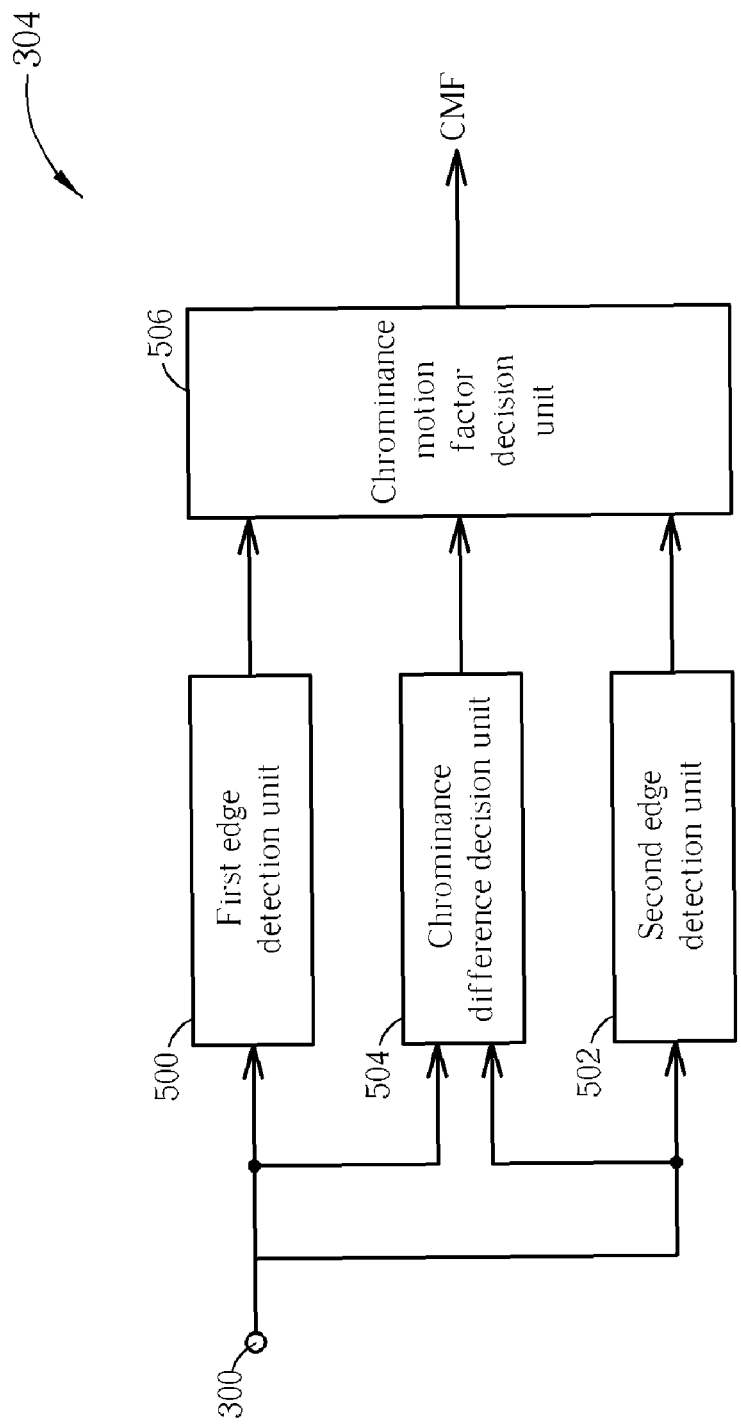
FIG. 5 is a schematic diagram of a preferred embodiment of the chrominance motion detection unit.

Please refer to FIG. 5. FIG. 5 is a schematic diagram of a preferred embodiment of the chrominance motion detection unit 304. The chrominance motion detection unit 304 comprises a first edge detection unit 500, a second edge detection unit 502, a chrominance difference decision unit 504, and a chrominance motion factor decision unit 506. The first edge detection unit 500 and the second edge detection unit 502 are utilized for determining edge intensities of adjacent frames, and can be any edge detection devices capable of determining the edge intensities of the images. The chrominance difference decision unit 504 is utilized for determining differences of the chrominance signals with the same phase between adjacent frames, and the operation is in like manner as shown in FIG. 6. According to decision results of the first edge detection unit 500 and the second edge detection unit 502, the chrominance motion factor decision unit 506 adjusts the differences determined by the chrominance difference decision unit 504, and outputs the chrominance motion factors CMF accordingly.

With the luminance motion detection unit 302 and the chrominance motion detection unit 304 shown in FIG. 4 and FIG. 5, the motion detection device 30 can determine the motion factors of the images according to the luminance motion factors YMF and the chrominance motion factors CMF of adjacent frames. Therefore, if a motion image has only chrominance differences but no great luminance differences or an image has an object jumping or swinging between two positions, the present invention still can determine the image as a motion image. Thus, when applying the motion detection device 30 in the three-dimensional luminance and chrominance separation circuit 10 shown in FIG. 1 (namely, replacing the motion detector 110), the filter selection unit 108 can correctly determine weightings of the signals Y4 and C4 and the signals Y3 and C3 according to the decision results of the motion detection device 30, so as to enhance the image quality.

Please note that, FIG. 4 and FIG. 5 are schematic diagrams of preferred embodiments of the luminance motion detection unit 302 and the chrominance motion detection unit 304, and those skilled in the art can certainly realize them with software and hardware techniques and are not restricted by the embodiments.

As mentioned above, the present invention determines the luminance motion factors and the chrominance motion factors respectively for further determining the motion factors of the images. In this case, if a motion image has only chrominance differences but no great luminance differences or an image has an object jumping or swinging between two positions, the present invention still can determine the image as a motion image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting motion in an image display device comprising:
    receiving a plurality of composite video signals having luminance signals and chrominance signals corresponding to a plurality of frames;
    determining luminance motion factors of the plurality of frames according to the luminance signals of the plurality of composite video signals;
    determining chrominance motion factors of the plurality of frames according to edge intensities of the plurality of frames and the chrominance signals of the plurality of composite video signals; and
    determining motion factors of the plurality of frames according to the luminance motion factors and the chrominance motion factors;
    wherein the step of determining chrominance motion factors of the plurality of frames according to edge intensities of the plurality of frames and the chrominance signals of the plurality of composite video signals further comprises:
        utilizing a first edge detection unit for determining edge intensity of frames corresponding to a first composite video signal of the plurality of composite video signals;
        utilizing a second edge detection unit for determining edge intensity of frames corresponding to a second composite video signal of the plurality of composite video signals;
        utilizing a chrominance difference decision unit for determining difference between chrominance signals of the same phase in the first composite video signal and the second composite video signal; and
        utilizing a chrominance motion factor decision unit coupled to the first edge detection unit, the second edge detection unit, and the chrominance difference decision unit, for adjusting decision results of the chrominance difference decision unit to determine the chrominance motion factors of the plurality of frames according to the edge intensities determined by the first edge detection unit and the second edge detection unit.

2. The method of claim 1, wherein determining the luminance motion factors of the plurality of frames according to the luminance signals of the plurality of composite video signals is sequentially determining each difference between low frequency parts of composite video signals corresponding to adjacent frames for determining the luminance motion factors of the plurality of frames.

3. The method of claim 1, wherein the plurality of composite video signals conforms to an NTSC (National Television System Committee) broadcast television standard.

4. The method of claim 1, wherein the first composite video signal and the second composite video signal are corresponding to adjacent frames.

5. A motion detection device for an image display device comprising:
    a reception end for receiving a plurality of composite video signals having luminance signals and chrominance signals corresponding to a plurality of frames;
    a luminance motion detection unit coupled to the reception end for determining luminance motion factors of the plurality of frames according to the luminance signals of the plurality of composite video signals;
    a chrominance motion detection unit coupled to the reception end for determining chrominance motion factors of the plurality of frames according to edge intensities of the plurality of frames and the chrominance signals of the plurality of composite video signals; and
    a motion factor decision unit coupled to the luminance motion detection unit and the chrominance motion detection unit for determining motion factors of the plurality of frames according to the luminance motion factors and the chrominance motion factors;
    wherein the chrominance motion detection unit further comprises:
        a first edge detection unit coupled to the reception end for determining edge intensity of frames corresponding to a first composite video signal of the plurality of composite video signals;
        a second edge detection unit coupled to the reception end for determining edge intensity of frames corresponding to a second composite video signal of the plurality of composite video signals;
        a chrominance difference decision unit coupled to the reception end for determining difference between chrominance signals of the same phase in the first composite video signal and the second composite video signal; and a chrominance motion factor decision unit coupled to the first edge detection unit, the second edge detection unit, and the chrominance difference decision unit, for adjusting decision results of the chrominance difference decision unit to determine the chrominance motion factors of the plurality of frames according to the edge intensities determined by the first edge detection unit and the second edge detection unit.

6. The motion detection device of claim 5, wherein the luminance motion detection unit comprises:
   a first low-pass filtering unit coupled to the reception end for low-pass filtering a first composite video signal of the plurality of composite video signals;
   a second low-pass filtering unit coupled to the reception end for low-pass filtering a second composite video signal of the plurality of composite video signals; and
   a difference decision unit coupled to the first low-pass filtering unit and the second low-pass filtering unit for calculating difference between low-pass filtering results of the first low-pass filtering unit and that of the second low-pass filtering unit to determine the luminance motion factors.

7. The motion detection device of claim 6, wherein the first composite video signal and the second composite video signal are corresponding to adjacent frames.

8. The motion detection device of claim 6, wherein the first low-pass filtering unit comprises:
   a plurality of storage units coupled to the reception end for temporally storing data; and
   a two-dimensional low-pass filter coupled to the plurality of storage units for performing two-dimensional filtering for data stored in the plurality of storage units.

9. The motion detection device of claim 6, wherein the second low-pass filtering unit comprises:
   a plurality of storage units coupled to the reception end for temporally storing data; and
   a two-dimensional low-pass filter coupled to the plurality of storage units for performing a two-dimensional filtering operation for the data temporally stored in the plurality of storage units.

10. The motion detection device of claim 6, wherein the difference decision unit comprises:
   a subtraction unit coupled to the first low-pass filtering unit and the second low-pass filtering unit for calculating subtraction results of low-pass filtering results of the first low-pass filtering unit and that of the second low-pass filtering unit; and
   an absolute value calculation unit couple to the subtraction unit for calculating absolute values of the subtraction results of the subtraction unit.

11. The motion detection device of claim 5, wherein the first composite video signal and the second composite video signal are corresponding to adjacent frames.

12. The motion detection device of claim 5, wherein the plurality of composite video signals conform to an NTSC (National Television System Committee) broadcast television standard.

* * * * *